United States Patent

Ladensack

[11] Patent Number: 6,092,856
[45] Date of Patent: Jul. 25, 2000

[54] TRAILER COVER

[76] Inventor: August J. Ladensack, 7238 Marine City Hwy., China Township, Mich. 48054

[21] Appl. No.: 09/386,625

[22] Filed: Aug. 31, 1999

[51] Int. Cl.[7] .......................................................... B60J 7/00
[52] U.S. Cl. ...................................... 296/100.11; 296/136
[58] Field of Search ................................ 296/136, 100.14, 296/100.11

[56] References Cited

U.S. PATENT DOCUMENTS

| | | |
|---|---|---|
| 4,402,544 | 9/1983 | Artim et al. ........................ 296/100.11 |
| 4,934,302 | 6/1990 | Harper . |
| 5,058,946 | 10/1991 | Faber . |
| 5,119,752 | 6/1992 | Doherty . |
| 5,291,848 | 3/1994 | Wilhelm et al. . |
| 5,481,999 | 1/1996 | Clark . |
| 5,564,358 | 10/1996 | Newton . |

Primary Examiner—Gary C. Hoge
Attorney, Agent, or Firm—Kenneth L Tolar

[57] ABSTRACT

A canopy style trailer cover for protecting recreational vehicles mounted on a trailer includes a plurality of U-shaped frame members, each having a pair of opposing arms that terminate at a distal end. The respective ends are pivotally joined to the side of a trailer. A cover member having a substantially semi-circular cross-sectional configuration is mounted over the frame members. The pivotable frame members allow the cover to be pivoted and collapsed toward the rear of the trailer in an according style fashion providing convenient access to the vehicle.

4 Claims, 2 Drawing Sheets

— SEE FIG.4

TRAILER COVER

BACKGROUND OF THE INVENTION

The present invention relates to an aerodynamic, easy to open trailer cover particularly designed to cover trailers which tow recreational devices such as snowmobiles and jet skiis.

DESCRIPTION OF THE PRIOR ART

Recreational devices such as boats, snowmobiles and jet skiis are often transported on land with a trailer. When such devices are mounted on a trailer, however, they are susceptible to damage from external elements such as snow, moisture and debris. A myriad of trailer covers have been heretofore designed for protecting such recreational devices. However, most relate to a heavy rigid cover which is difficult to remove and install and expensive to manufacture. Alternatively, such covers include a canvas sheet that must be draped across the recreational device which is time consuming and difficult. The present invention provides a uniquely designed canopy style trailer cover which may be quickly and conveniently collapsed toward the rear of a trailer providing convenient access to the recreational vehicle.

Various trailer covers exist in the prior art. For example, U.S. Pat. No. 5,564,358 issued to Newton relates to an over and under boat cover including a top cover for positioning over the top side of the boat and a cushioning bow cover extending over the forward underside of the boat.

U.S. Pat. No. 5,481,999 issued to Clark relates to a trailer mounted boat cover including a rigid forward shield which provides protection from road debris during towing. The cover also includes an aerodynamic forward section which reduces flutter of the flexible cover.

U.S. Pat. No. 5,291,848 issued to Wilhelm et al relates to a flexible hood structure for securement about a bow portion of a boat with tether lines extending from a rear edge for securing to an associated trailer.

U.S. Pat. No. 5,119,752 issued to Doherty relates to a trailer for personal motor-craft including a lower shell that floats and an upper shell that fits over the top edge of the lower shell to form a sealing pod for holding various supplies.

U.S. Pat. No. 5,058,946 issued to Faber relates to a hinged trailer and boat cover. The cover is movable between raised and lowered positions by a pair of jack assemblies.

U.S. Pat. No. 4,934,302 issued to Harper relates to a boat storage and transportation apparatus having a mobile trailer and a unitary, aerodynamically contoured rigid cover cantilevered for raising and lowering by hydraulically activated cylinders on either side of the front end of the cover.

Although various trailer covers exist in the prior art, none relate to a collapsible, canopy style cover according to the present invention. The design allows the cover to be quickly moved between an open and closed position and provides an aerodynamic configuration when the cover is installed.

SUMMARY OF THE INVENTION

The present invention relates to uniquely designed canopy style trailer cover including a substantially semi-cylindrical cover member mounted over a plurality of U-shaped support members. Each of the support members have a pair of opposing terminal ends each of which are pivotally joined to each other and a side of the trailer. Accordingly, the front of the cover may be collapsed toward the rear of the trailer in an accordion type fashion providing quick and easy access to the recreational vehicle. It is therefore an object of the present invention to provide a trailer cover that protects trailer mounted vehicles from external elements.

It is another object of the present invention to provide a trailer cover which may be easily opened and closed without removing the cover.

It is yet another object of the present invention to provide a trailer cover having an aerodynamic configuration to minimize wind drag when the cover is installed on a moving trailer. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
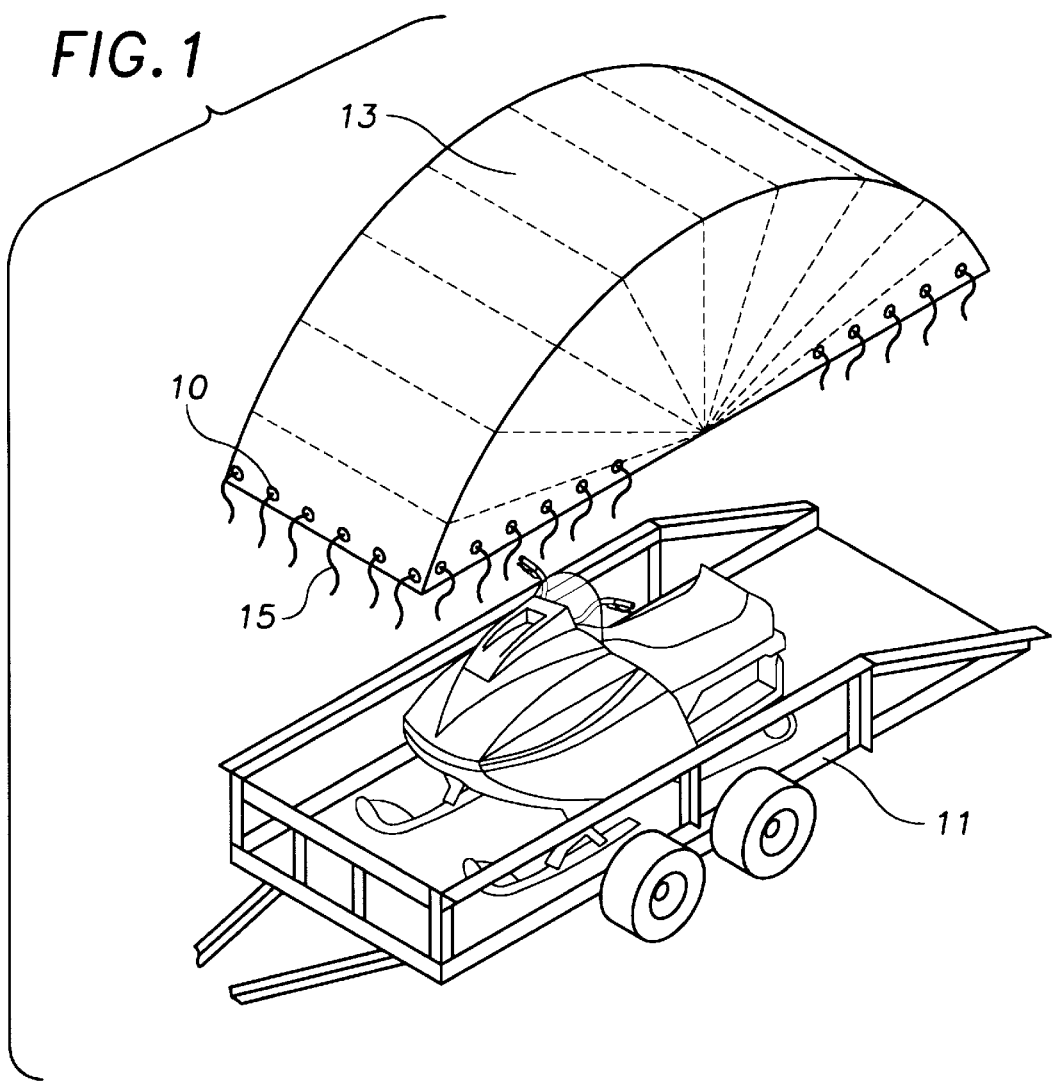
FIG. 1 is a perspective view of the cover member in an extended position and slightly exploded from the trailer.
Figure 2:
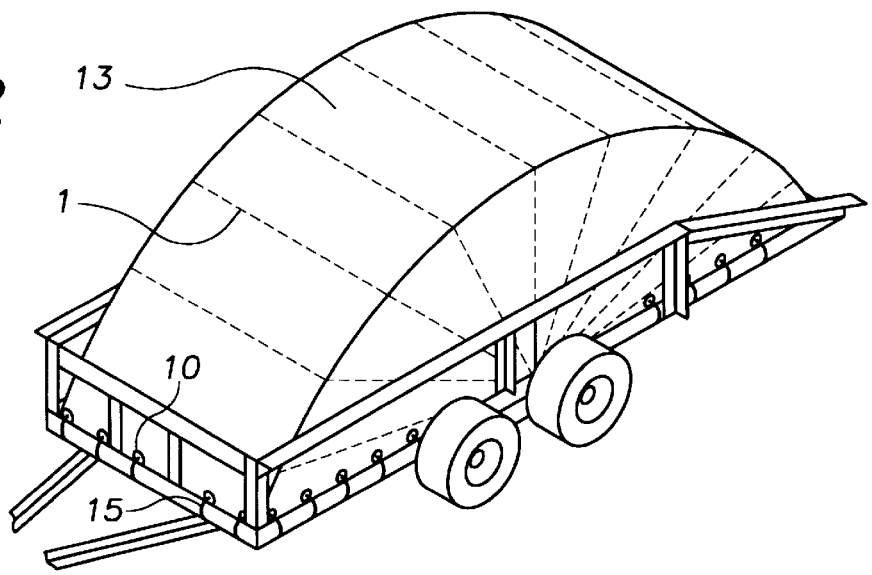
FIG. 2 depicts the trailer cover installed on a trailer.
Figure 3:
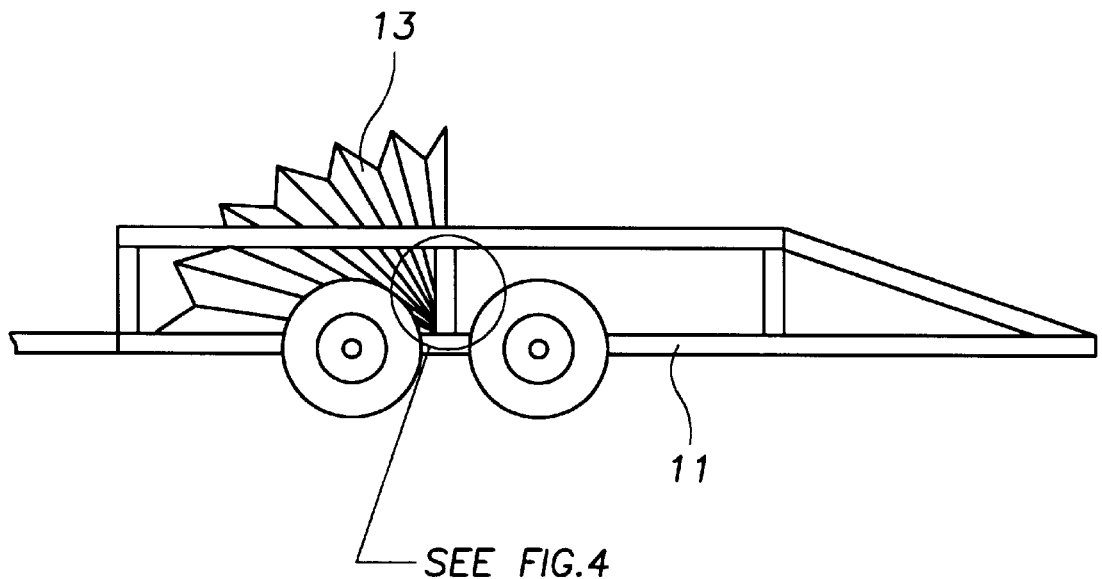
FIG. 3 depicts the cover in a partially open position.
Figure 4:
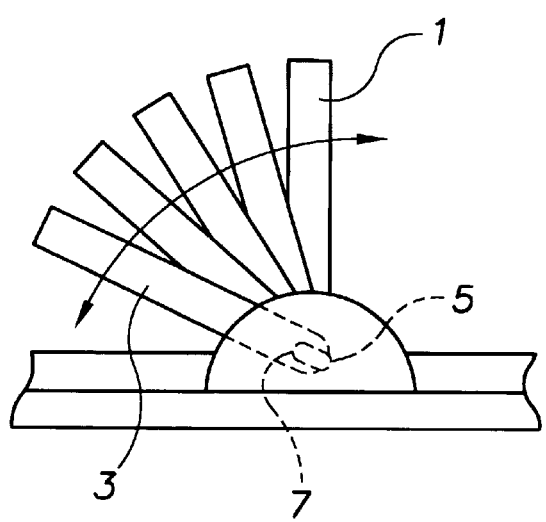
FIG. 4 is a side view of the frame members.

Referring now to FIGS. 1 through 4, the present invention relates to an aerodynamic canopy style trailer cover including a plurality of substantially U-shaped frame members 1 each having first 3 and second opposing arms each terminating at a distal end. The distal ends of each arm includes an eyelet 7 having a pin or shaft 5 received therein. The shaft is secured to a side of the trailer using conventional means. The pivotally joined arms are attached to an intermediate portion of a corresponding trailer side rail 11 whereby the frame members radially extend from the trailer and each may be pivoted relative to the others. The means for pivotally joining such joining such frame members is conventional such as that found on certain infant strollers and similar devices.

A cover member 13 having a substantially semi-circular cross-sectional configuration is mounted on the frame members. The cover member is constructed with canvas or a similar flexible, weather resistant material. The cover member preferably includes lower front and rear edges and two lower opposing side edges, any of which may include grommets 10 for securing the edges of the cover member to the trailer. The respective edges of the cover may be secured with straps, cords 15, hooks, bolts, sleeves or any other conventional means.

The cover according to the present invention may be quickly collapsed toward the rear of the trailer in an accordion style fashion to provide quick, selective access to the vehicle therebeneath. When in a closed position, the cover member provides an aerodynamic, weather-proof cover that minimizes wind drag.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a trailer having two opposing sides, a rear edge and a front edge, a trailer cover comprising:

a plurality of substantially U-shaped frame members, each frame member having first and second opposing side arms, each side arm terminating at a distal end, the distal ends of both side arms having an eyelet thereon, the eyelets on each of the first arms being aligned with each other with a first pin received therein, said first pin attached on one of the sides of said trailer, the eyelets on the second arm being aligned with each other with a second pin received therein, said second pin attached to the other side of said trailer whereby each frame member can pivot relative to the other as well as said trailer;

a collapsible cover member having a substantially semi-circular cross-sectional configuration, said cover member overlaying said frame members whereby said cover may be collapsed towards the rear edge of said trailer and extended toward the front edge of said trailer in an accordion type fashion to provide selective access to a vehicle therebeneath.

2. A device according to claim 1 wherein said cover member further includes at least one lower edge.

3. A device according to claim 2 further comprising means for attaching said lower edge to said trailer.

4. A device according to claim 3 wherein said means for attaching said lower edge to said trailer comprises:

a plurality of grommets adjacent the lower edge of said cover member, said grommet having a fastener means received therein for attaching said cover member to said trailer.

\* \* \* \* \*